Aug. 6, 1957 M. E. WALLACE ET AL 2,801,610
METHOD OF FEEDING POULTRY OR THE LIKE
Original Filed July 31, 1952 3 Sheets-Sheet 1

INVENTOR.
M. E. Wallace & R. F. Wallace
BY Robb & Robb,
Attorneys

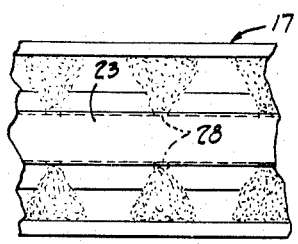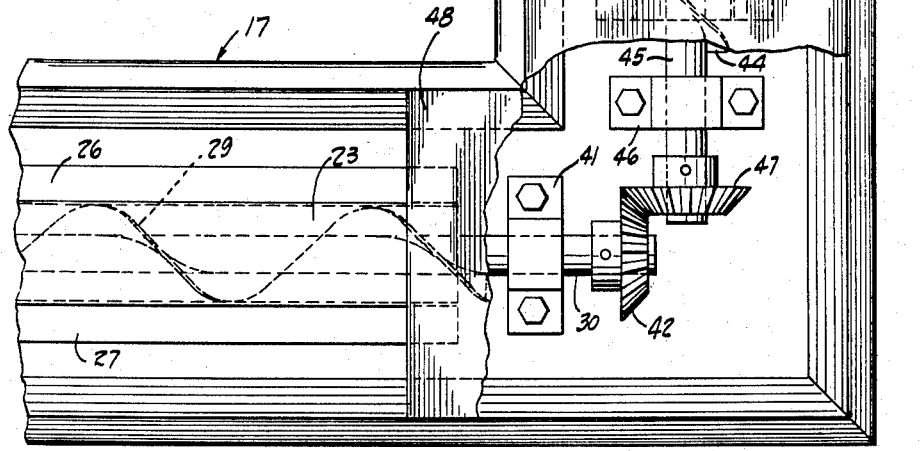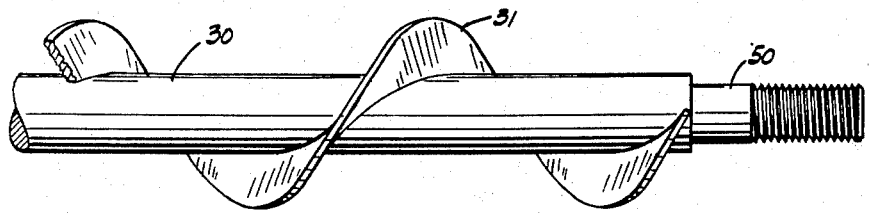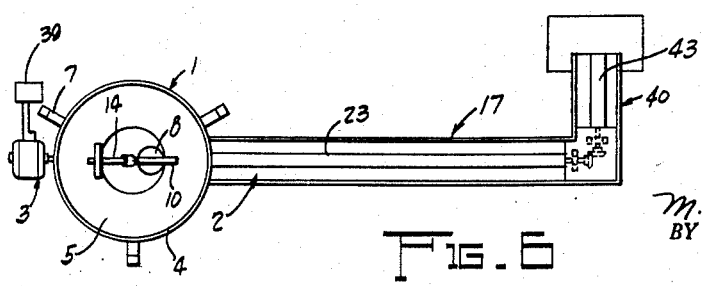

Aug. 6, 1957 M. E. WALLACE ET AL 2,801,610
METHOD OF FEEDING POULTRY OR THE LIKE
Original Filed July 31, 1952 3 Sheets-Sheet 3
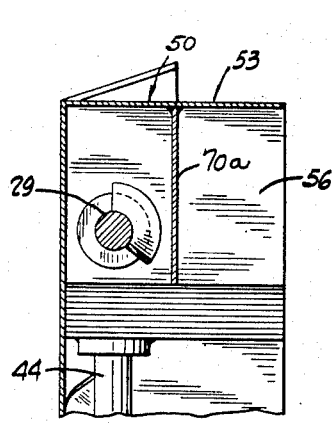
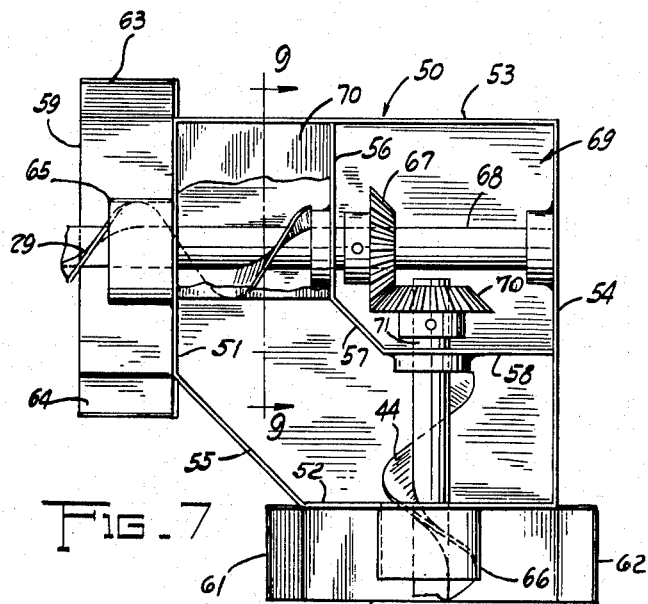
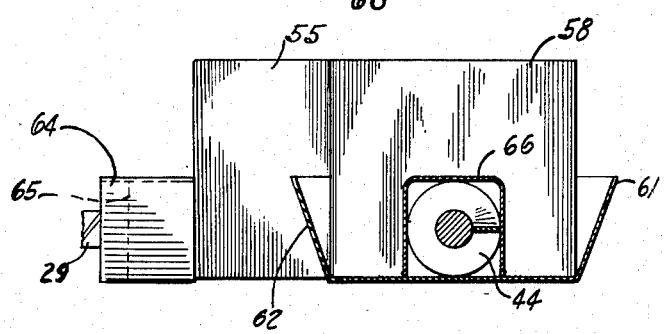
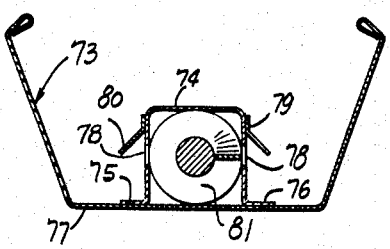
INVENTOR.
M. E. Wallace & R. J. Wallace,
BY Robb & Robb,
Attorneys

United States Patent Office 2,801,610
Patented Aug. 6, 1957

2,801,610

METHOD OF FEEDING POULTRY OR THE LIKE

Maurice E. Wallace and Robert F. Wallace, Delphi, Ind., assignors to Feed-O-Matic Manufacturing Corporation, Delphi, Ind., a corporation Original application July 31, 1952, Serial No. 301,842, now Patent No. 2,745,381, dated May 15, 1956. Divided and this application January 30, 1956, Serial No. 562,182

3 Claims. (Cl. 119—51)

This application is a division of our prior application Serial No. 301,842, filed July 31, 1952, now matured into Patent No. 2,745,381.

The invention relates to feeding of animals and particularly to a novel method of feeding chickens or other fowl or poultry or the like.

While the invention has been found particularly applicable where large scale chicken feeding operations are carried on, which may be very time-taking under certain circumstances, the method hereof makes provisions for rapid feeding of the largest flocks simultaneously and uniformly with minimum attention by the person or persons in charge of such feeding operation.

Heretofore large scale feeding operations have been carried out but on the whole require so much attention by the operators, that the necessity of improved methods is well known. Whereas certain machinery of various kinds has been availed of, the operation of that machinery has depended on commonly known principles and assemblages of well known mechanisms, the present invention may be carried out conceivably by various means none of which as a whole is currently in use or known to us.

While we have invented an apparatus which will carry out the novel method hereof, which apparatus is the subject of the prior application mentioned, we are well aware that other apparatus may be provided or other means adopted which will be effective for the purpose hereof, but whereby the method hereof is primarily the subject matter, and may be carried out thereby.

The principal object of this invention is therefore to provide a novel method of feeding poultry or the like.

Another object of the invention is to provide a method which will assure uniform distribution of feed to a large number of chickens or other poultry.

A further object of the invention is to make possible the deposit of feed at a plurality of stations simultaneously, whereby the tendency to crowd or injure weaker poultry away from the feed as deposited is substantially reduced or entirely eliminated.

Other and further objects of the invention will be made clear as the method of this invention is described in relation to its being carried out by the apparatus disclosed in the accompanying drawings wherein:

Figure 3 is a fragmentary view in top plan illustrating the manner in which the feed is distributed.

Figure 4 is a fragmentary view, somewhat enlarged, illustrating the instrumentalities availed of to change the direction of the feeding and conveying unit.

Figure 5 is an enlarged fragmentary view showing a section of the screw conveyor member.

Figure 6 is a somewhat diagrammatic view, being largely a top plan disclosure of the general arrangement of one form of feeding apparatus.

Figure 7 is a top plan view of a modified form of corner unit.

Figure 8 is an end view in elevation of the corner unit of Figure 7.

Figure 9 is a fragmentary sectional view, taken about on the line 9—9 of Figure 7 looking in the direction of the arrows.

Figure 10 is a sectional view of a modified form of feed supporting and conveying member or unit, similar to that shown in Figure 2.

Figure 1:
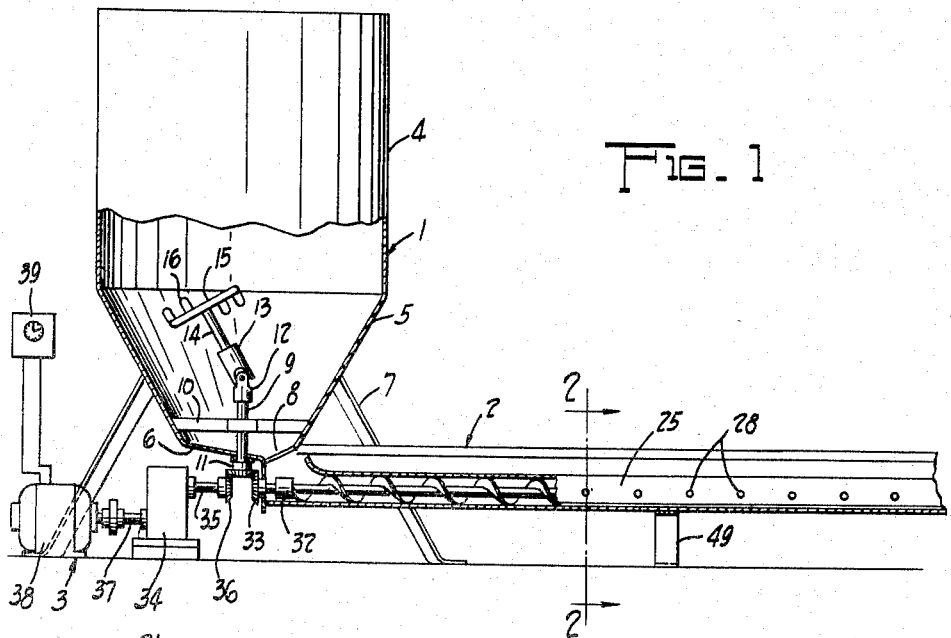
Figure 1 is a view partially illustrating an apparatus for carrying out the method, certain portions thereof being shown in longitudinal section.

Referring initially to Figures 1 and 6, a feeding apparatus by which the method of this invention may be carried out is shown as generally comprising a feed storage means denoted 1, a feed supporting and conveying unit denoted 2, and an operating and timing unit designated 3.

First describing the feed storage means, it will be seen that the same is in the form of a round hopper 4 tapering at 5 towards the bottom 6. The hopper 4 is suitably supported by legs 7 fastened on the tapering portion 5 of the hopper, and is provided at its bottom 6 with an opening 8. Within the hopper, is an agitator which includes a substantially vertical shaft 9 guidingly supported by a transverse bracket 10 intermediate the ends of the shaft 9, the lower end of the shaft 9 being equipped with a bevel gear 11. Of course, it will be understood that the shaft 9 at its lower end extends through the bottom 6 in a suitable opening.

At the upper end of the shaft 9, the same is provided with a universal joint, including a part 12 fixed to the shaft 9, and a part 13 universally connected to the part 12. Suitably carried by the part 13 and fixed thereto, is a further shaft 14, on the outer end of which is an arm 15 having fingers 16 extending therefrom. It is noted that the upper shaft 14 is not guided in any manner, but is free to move around in the interior of the bin or hopper 4, when rotated by the bevel gear 11 previously mentioned, and is adapted to keep the feed stored in the hopper 4 from packing therein, and assist the flow of feed through the opening 8.

Figure 2:
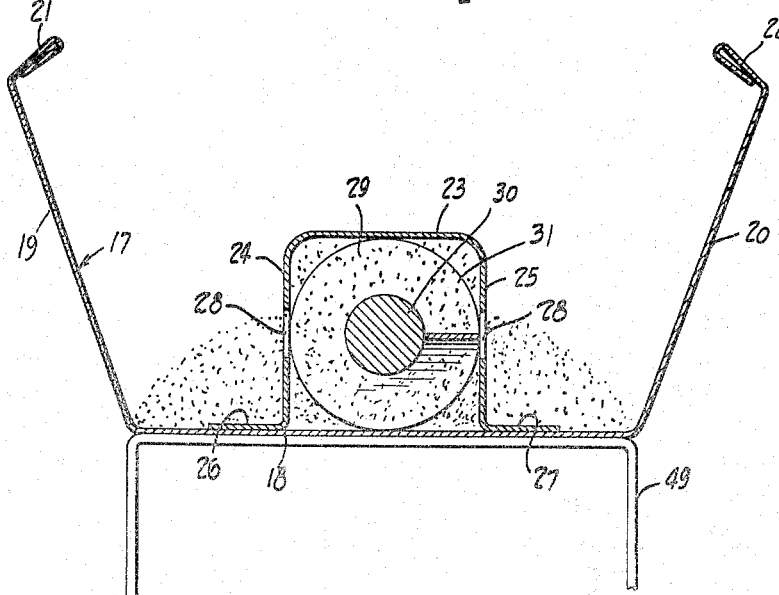
Figure 2 is an enlarged sectional view, taken about on the line 2—2 of Figure 1, looking in the direction of the arrows.

The feed supporting and conveying unit 2, is as shown in Figure 2, generally comprised of a trough 17, having a flat bottom member 18 thereon, and the upwardly extending side members 19 and 20. The side members 20 diverge outwardly from their connection with the bottom member 18, and at their outer extremities are provided with lips 21 and 22 respectively, which are turned somewhat inwardly. Within the trough 17 a suitable conduit 23 of generally rectangular configuration in reality being formed so as to be an inverted U-shaped member, includes opposite sides 24 and 25. At the lower ends of the sides 24 and 25, flanges 26 and 27 are formed so as to extend outwardly from the side members and provide means for fastening the conduit 23 in place on the bottom 18 of the trough 17, by welding or the like.

As seen in Figure 1, the side 25 is shown as being provided with a series of spaced holes or openings 28, the same extending throughout the length of the conduit 23. It will be understood that the trough 17 is of an elongated nature, and relatively narrow, and that the conduit 23 extends throughout the length of the trough. Within the conduit 23, a special screw 29 is provided. The screw 29 includes a shaft 30 with the spiral member 31 suitably fixed thereto. The pitches of the spiral member are spaced so as to substantially correspond with the spacing between the openings 28 for purposes which will be hereinafter set forth.

At the end of the feed supporting and conveying unit which is nearest the feed storage hopper 4, the same is adapted to be suitably fastened so as to receive through the opening 8 feed descending from the hopper. The screw 29 at its inner end, and by means of the shaft 30 thereof, is supported in a suitable pillow block 32 resting on the bottom 18 of the trough. The shaft 30 extends outwardly beyond the end of the trough 17, and is equipped with a bevel gear 33 thereon, adapted to mesh with the bevel gear 11 previously mentioned.

It should be noted that the holes 28 shown in Figure 1 are also provided on the opposite side 24 of the conduit 23, and substantially directly opposite those holes in each case, although not necessarily limited thereto as will be understood.

In order to provide for operation of the agitator within the hopper 4, and rotation of the screw 29, a suitable operating arrangement already mentioned as being denoted 3 includes a suitable speed reduction unit 34. The speed reduction unit 34 is provided at its output side with a shaft 35 upon which is suitably mounted a bevel gear 36. It will be apparent that the bevel gear 36 is in engagement with the bevel gear 11 previously mentioned, and that rotation of the shaft 35 will effect simultaneous rotation of the shaft 9 of the agitator, and of the screw 29 of the feed supporting and conveying unit 2. In order to effect a drive of the speed reducer 34, the same is connected by means of a shaft 37 to a motor 38. The operation of the motor 38 may preferably be controlled by a time-clock unit 39 of any conventional construction. The main requirement of such a time-clock unit 39 is that the same is adapted to complete a circuit and effect operation of the motor 38 at suitable intervals, which intervals may be adjusted as will be subsequently explained.

Under many conditions where it is desirable to provide for a greater length of feed supporting and conveying unit, and yet the straightaway limitations of the barn or other place of installation exists, a change in direction in the said unit may be necessary. As shown in Figure 4, this change in direction may be effected by provision of a further feed supporting and conveying section designated 40, of similar configuration to that designated 2, and placed in an angular relation therewith. In order to provide for supplying feed to this unit 40, the shaft 30 of the screw is supported in a pillow block 41 mounted on the bottom 18 of the first unit mentioned, and equipped at the outer end the shaft 30 is provided with a bevel gear 42. Within the unit 40, the same having a conduit 43 and a screw 44 therein, equipped with a shaft 45, the shaft 45 is also supported in a pillow block 46, and at the outer end of the shaft a bevel gear 47 is mounted, and in connection with the bevel gear 42 previously mentioned. It will be apparent that rotation of the bevel gear 42 will impart rotation to the bevel gear 47 and the screw 44. However, in order to insure that the feed moving outwardly from the end of the conduit 23 is in turn picked up by the screw 44, a suitable plate 48 is provided, and seated over the bevel gears, and associated pillow blocks 41 and 46. Thus when the corner, so to speak, is filled with feed, the same will be picked up by the screw 44 and transferred thereby so as to be forced through the holes or openings provided in the sides of the conduit 43 as is the conduit 23.

It is understood that any suitable supporting brackets 49 may be provided so as to maintain the respective portion of the unit 2 and 40 as the case may be, spaced from the floor of the barn as desired.

Referring now to Figures 2 and 3, in conjunction with an explanation of the operation of the apparatus, it will be noted that when the feed passes through the opening 8 in the disclosure of Figure 1, the same is picked up by the screw 29, and moved thereby through the conduit 23. As the feed moves through the conduit and is carried thereby upon rotation of the screw 29, the same will be forced outwardly through the opening 28 on opposite sides of the conduit in a manner such as illustrated in Figures 2 and 3. Since only a portion of the feed is extruded or forced through the respective openings, an additional portion of the feed will be carried by the screw, and forced through succeeding openings. Thus, when the entire conduit has once been filled with feed, subsequent operation of the screw therein, will force a quantity of feed out through the openings at each revolution of the screw. It will also be apparent that as the motor 38 is operated, and the speed reducer 34 likewise operated, the agitator within the hopper 4 is similarly rotated and maintains a constant supply of feed to the feed supporting and conveying unit 2.

In actual operation, it has been found that by suitable setting of the timing unit 39 so as to effect an intermittent or periodic operation of the agitator and screw, the same may be calculated so as to provide sufficient feed for all ages of poultry for example. It has specifically been determined that in a suitable apparatus of the nature herein discussed, poultry which has attained the age of approximately 6 weeks, requires that the screw be operated for a period of about 3 minutes each half hour. It will be obvious that correspondingly long periods (or shorter periods) may be provided for so as to deposit sufficient feed at each one of the openings to care for a large number of chickens or the like who are being fed by the unit. In an actual apparatus constructed in accordance with the disclosure herein, the period of time during which operation is effected may be increased gradually as the chickens grow and since regular feeding is productive, growth is more uniform and encouraged thereby. It has further been found that since the peculiar form of conveyor unit provides simultaneous supply of feed at each one of the openings, there is a materially reduced effort on the part of the poultry to crowd and otherwise prevent weaker chickens or the like to obtain suitable quantities of feed. It will be apparent that since the feed conveying and supporting unit 2 is of relatively long configuration desirably, that a larger and greater length of feed supply is available at all times. In addition, the formation of the trough 17 is found to conserve the feed so that the same is not scattered when the poultry is feeding, and it has further been found that by suitable timing of the operation, there is no wasted feed at the extreme end of the feed conveying and supporting unit 2, since the feed is substantially all forced out of the openings 28 and thus waste is virtually eliminated.

It will be readily understood that the hopper 4 may be filled up with feed in the morning, for example, and without further attention on the part of the operator will effectively supply the demands of a large number of poultry throughout the day or for any predetermined period within the capacity of the hopper 4.

It should also be noted that the screw 29 may be provided in any suitable length and is equipped at one end with a male threaded section 50 on the shaft 30 adapted to coact with a correspondingly female threaded member of an adjacent screw. Thus, any length of feed conveying and supporting unit may be provided, it being obvious that the trough 17 may be made in corresponding lengths and suitably fastened together.

In Figure 5, a screw found to be particularly advantageous for carrying out the method herein, is illustrated in detail and from the view it will be seen that the pitches are each formed with what may be called a backward inclination from the root thereof to the outer edge. Thus the continuous blade comprising the pitches as a whole is in reality sloping in a rearward direction considering the right hand end of the section shown, as the forward portion of the screw.

The formation just described provides for the extrusion of a portion of the feed through each of the openings in the sides of the conduit 23 as the feed is being carried by the screw during rotation thereof.

In the modifications of certain of the elements, as shown in Figures 7 to 10 inclusive, and dealing at this point primarily with Figure 7, it is seen that a somewhat different form of corner arrangement is provided in order to change direction of the feed supporting and conveying unit. This unit of Figure 7 is understood to be of a form which may be substituted for that shown in Figure 4, and essentially comprises a trapezoidal shaped body member, generally denoted 50, which includes the walls 51 and 52, lying at substantially right angles, and connected at their ends to walls 53 and 54. Intermediate the walls 51 and 52, there is a further wall 55, which extends at an angle with relation to the walls 51 and 52. Spaced toward the juncture of the walls 53 and 54, is a corresponding arrangement of walls including the parts 56, 57, and 58, the latter being largely parallel to and spaced from the walls 51, 52 and 55. There is thus provided a passage for feed as will be presently explained.

Suitably provided at and around the wall 51, there is a trough engaging member 59 and at the wall 52, a similar trough engaging member 60 is provided. As shown in Figure 8, the trough engaging member includes the upstanding sides denoted 61 and 62 for the member 60, and 63 and 64 for the member 59. Within the members 59 and 60, are suitable conduit engaging sections denoted 65 and 66 it being apparent that by suitable manipulation of the respective feed supporting and conveying units 17 and 40 as shown in Figure 4, the same may be suitably engaged with the respective trough supporting members 59 and 60. The screw 29, for example, may be positioned as shown in Figure 7, and in such position the same enters the conduit engaging portion 65 and in turn by suitable threaded engagement is connected to a bevel gear 67 mounted on a shaft 68 in a gear box chamber 69. The bevel gear 67 will be supported on the shaft 68 and suitably fixed thereto so as to rotate therewith, the shaft 68 being supported in suitable bearings in the gear box portion 69.

A further bevel gear 70 is shown as being supported on a shaft 71, being adapted to engage for example, with the screw 44 in any suitable manner, preferably by threaded engagement therewith so as to be removable therefrom.

It will therefore be apparent that when the respective screws 29 and 44 are in their positions, and the said screw 29 is being rotated, for example, such rotation will also be imparted to the screw 44. As the feed is moved along into the passage between the walls 55 and 57 for example, by the screw 29, the same will subsequently be picked up by the screw 44 and forced out into the corresponding feed supporting and conveying unit 40 as will be apparent. In order to speed up the transfer of the feed from the conveyor screw 29 to the screw 44, there is shown in Figure 9 a suitable baffle 70a, placed over the screw 29 and adapted to confine the feed thereto and therearound so that it will be picked up by the screw 44. In addition, it will usually be desirable to provide a cover for the entire unit just described so as to prevent the poultry from contact with the screws or gears provided.

As shown in Figure 10, the feed supporting and conveying unit may be formed of a trough 73, similar to the trough 17 previously described, and having a conduit 74 suitably fixed at its lower ends 75 and 76 by welding or otherwise to the bottom 77 of the trough unit 73. This conduit 74 will of course be substantially rectangular as was true with the conduit previously described and denoted 24, being also provided with suitable holes 78 in the sides thereof. In addition, this particular form of conduit is provided with flanges 79 and 80, suitably fixed by welding or otherwise to the upper portion of the conduit and extending outwardly and downwardly therefrom. These flanges 79 and 80 are provided for the obvious purpose of preventing the poultry from being caught in the feed screw within the conduit 74 as would be possible through the openings 78 therein. It should be understood that the feed screw which in this instance may generally be denoted 81, is formed like the screws previously described, in that the same has pitches which are in effect lying at an angle in what may be termed a rearward direction so as to compel a forcing outwardly of the feed through the openings 78 in a lateral direction. However, the forcing of the feed is not interfered with by the flanges 79 and 80, but in any event ready access is provided to the feed for the chickens or the like being supplied by the apparatus.

It will be understood further that by varying the angle of the pitches with respect to the axis of the shaft, in a backward direction as previously mentioned, the feed may be forced outwardly more rapidly if desired. However, it will be apparent that the forcing out of feed more rapidly, will also reduce the quantity of the feed to be carried along by the screw, and therefore it is desirable to compromise between the two effects desired to be produced so as to most readily make available the feed to the poultry being supplied thereby. It will also be understood that the openings 78 for example, are desirably provided substantially midway between the upper and lower portions of the conduit 74, so that the extruding effect above generally described may be most readily carried out. By varying the height of the openings 78 a similar variation in the amount of feed being forced outwardly may be provided.

Under the best conditions of operation of the apparatus as shown and described herein, the feed will substantially entirely fill the conduit, once the apparatus is started into operation, and a column of feed may be said to be carried by the conveyor, certain portions of the column being forced outwardly at intervals through the openings provided in the sides of the conduit. This general operation may be characterized further by stating that the main stream of feed is carried by the screw, and at intervals throughout its length portions of that main stream are directed laterally therefrom into positions for access by the poultry being fed.

We claim:

1. The method of supplying feed to poultry or the like which comprises moving a main stream of feed through a confined area, and forcing a portion of the feed laterally from said main stream at a plurality of positions.

2. The method of supplying feed to poultry or the like which comprises moving feed in a main stream through a confined area, and simultaneously forcing portions of said feed laterally into a plurality of positions along said main stream.

3. The method of supplying feed to poultry or the like which comprises causing a main stream of feed to be moved through a confined area in one direction, and deflecting relatively predetermined quantities of such material laterally from the confined area at spaced intervals in its length, into a feeding area.

References Cited in the file of this patent

UNITED STATES PATENTS

| 2,515,455 | Lipton | July 18, 1950 |
| 2,563,321 | Dugan | Aug. 7, 1951 |
| 2,630,906 | Philipp | Mar. 10, 1953 |
| 2,646,023 | Virgil | July 21, 1953 |